United States Patent
Lemarchand

(10) Patent No.: US 11,399,146 B2
(45) Date of Patent: Jul. 26, 2022

(54) METHOD FOR CORRECTING DEFECTS AND IN PARTICULAR FOR REDUCING NOISE IN AN IMAGE PROVIDED BY AN IMAGE SENSOR

(71) Applicant: FIRST LIGHT IMAGING, Meyreuil (FR)

(72) Inventor: Stéphane Lemarchand, Saint Cannat (FR)

(73) Assignee: FIRST LIGHT IMAGING, Meyreuil (FR)

( * ) Notice: Subject to any disclaimer, the term of this patent is extended or adjusted under 35 U.S.C. 154(b) by 0 days.

(21) Appl. No.: 17/156,232

(22) Filed: Jan. 22, 2021

(65) Prior Publication Data

US 2021/0235032 A1    Jul. 29, 2021

(30) Foreign Application Priority Data

Jan. 28, 2020 (FR) ........................ 2000834

(51) Int. Cl.
| | |
|---|---|
| *H04N 5/365* | (2011.01) |
| *H04N 5/353* | (2011.01) |
| *H04N 5/367* | (2011.01) |
| *H04N 17/00* | (2006.01) |

(52) U.S. Cl.
CPC ......... *H04N 5/3651* (2013.01); *H04N 5/3535* (2013.01); *H04N 5/3675* (2013.01); *H04N 17/002* (2013.01)

(58) Field of Classification Search
CPC .. H04N 5/3651; H04N 5/3535; H04N 5/3675; H04N 17/002; H04N 5/365; H04N 5/378; H04N 5/361
See application file for complete search history.

(56) References Cited

U.S. PATENT DOCUMENTS

| | | | |
|---|---|---|---|
| 6,150,682 A * | 11/2000 | Sawada | H01L 27/14609 257/290 |
| 7,283,163 B1 | 10/2007 | Noda | |
| 2004/0051796 A1* | 3/2004 | Kelly | H04N 5/3651 348/243 |
| 2004/0051797 A1 | 3/2004 | Kelly et al. | |
| 2015/0110248 A1* | 4/2015 | Rabi | G01T 1/2018 378/62 |
| 2018/0114297 A1* | 4/2018 | Chuang | G06T 5/002 |

OTHER PUBLICATIONS

French Search Report for French Application No. FR2000834, dated Oct. 20, 2020, 8 pages.

* cited by examiner

*Primary Examiner* — Michael E Teitelbaum

(57) ABSTRACT

A method of correcting defects appearing in an image produced by an image sensor, the method comprising: receiving an image to be corrected, taken by the image sensor, receiving a temperature from the image sensor, acquired when the image to be corrected is taken by the image sensor, receiving an integration time applied by the image sensor when taking the image to be corrected, and for each pixel of the image to be corrected, subtracting from the pixel value a pixel-specific noise correction factor derived from a noise reduction model comprising a linear component dependent on the temperature of the image sensor, added to an exponential component depending on the temperature of the image sensor and multiplied by the integration time, the linear and exponential components depending on coefficients specific to the pixel.

18 Claims, 4 Drawing Sheets

METHOD FOR CORRECTING DEFECTS AND IN PARTICULAR FOR REDUCING NOISE IN AN IMAGE PROVIDED BY AN IMAGE SENSOR

CROSS-REFERENCE TO RELATED APPLICATION

This application is based on and claims priority under 35 U.S.C. § 119 to French Patent Application No. 20 00834 filed on Jan. 28, 2020, the disclosure of which is herein incorporated by reference in its entirety.

TECHNICAL FIELD

The present disclosure relates to the field of imaging devices such as video and still cameras. The disclosure relates in particular to imaging devices integrating image sensors in CMOS (Complementary Metal Oxide Semiconductor) or CCD (Charge-Coupled Device) technology, of the CTIA (Charge Trans Impedance Amplifier) or SF (Source Follower) type. The disclosure can be applied to the field of imaging in the visible range, as well as in SWIR, MWIR, LWIR (Short-, Mid-, Long-Wave Infra-Red) ranges.

BACKGROUND

Typically, a CMOS image sensor consists of pixels or photosites arranged in an array configuration. Each pixel includes a photosensitive area, usually a photodiode, configured to accumulate electric charges according to the light it receives, and a readout circuit to measure the amount of charges accumulated by the photodiode. The readout circuit includes a transfer transistor to control the transfer of the electric charges accumulated in the photodiode to a readout node. The pixel is thus controlled according to a cycle comprising an initialization phase, an integration phase, and a readout phase. During the integration phase, the photodiode accumulates electric charges according to the light it receives. The readout phase includes generating a signal corresponding to the amount of electric charges accumulated by the photodiode during the integration phase. The initialization phase includes eliminating the electric charges accumulated by the photodiode during the integration phase.

The images produced by today's image sensors are disturbed by various sources of noise, especially when the image sensors are miniaturized. The effects of some of these noise sources appear in the images taken when the image sensor is placed in the dark. Under these conditions, the pixel circuits of the image sensor may produce signals although the pixels are completely dark. It turns out that the amplitude of these dark signals varies with the temperature of the image sensor, and the integration time selected to generate the image. The amplitude of these dark signals can also vary from one pixel circuit to another within the same image sensor, and from one image sensor to another, even if they are from the same manufacturing batch.

It is known to establish a Fixed Pattern Noise image by generating a dark image using the image sensor placed in the dark, and to subtract this dark image from the images produced by the image sensor. To account for temperature variations and integration time, it would be necessary to produce such a dark image each time a new image is to be acquired. However, in many applications, especially video capture, the time available before each frame is usually insufficient to generate such a dark image. In addition, applying a correction to each frame or series of frames in the case of video images inevitably generates a flicker that can be upsetting.

It is therefore desirable to provide an efficient noise reduction method in an imaging device, which takes into account variations in image sensor temperature and changes in integration time, and which does not disturb the viewing experience. It is also desirable that the noise reduction method be adaptable to each imaging device.

SUMMARY

Embodiments relate to a method of correcting defects appearing in an image produced by an image sensor, the method comprising the steps of: receiving an image to be corrected, taken by the image sensor, receiving a temperature from the image sensor, acquired when the image to be corrected is taken by the image sensor, receiving an integration time applied by the image sensor when taking the image to be corrected, and for each pixel of the image to be corrected, subtracting from the pixel value a pixel-specific noise correction factor derived from a noise reduction model comprising a linear component dependent on the temperature of the image sensor, added to an exponential component depending on the temperature of the image sensor and multiplied by the integration time, the linear and exponential components depending on coefficients specific to the pixel.

According to an embodiment, the noise reduction model is defined by the following equation:

$$bm[i,j]=IT \times ad[i,j] \times \mathrm{Exp}(bd[i,j] \times TP) + ab[i,j] \times TP + bb[i,j]$$

where bm[i,j] is the noise correction factor to be subtracted from a corresponding pixel of the image to be corrected, IT is the integration time, TP is the temperature of the image sensor, EXP is the exponential function, and ad[i,j], bd[i,j], ab[i,j] and bb[i,j] are the pixel-specific coefficients.

According to an embodiment, the method comprises calculating the noise correction factor of each pixel each time the integration time is changed, or each time the temperature of the image sensor deviates from a previous value by more than a temperature deviation threshold value.

According to an embodiment, the method comprises the steps of: acquiring by the image sensor images in the absence of light with a minimum integration time, each image being taken at a distinct respective temperature, and determining, for each pixel of the image to be corrected, the coefficients of the linear component, by linear regression calculations applied to corresponding pixels in the images in the absence of light taken at the respective temperatures.

According to an embodiment, the method comprises the steps of: acquiring by the image sensor images in the absence of light, at different integration times, the image sensor being subjected to different temperatures, generating corrected images obtained by subtracting from each of the images taken by the image sensor in the absence of light at different integration times and at different temperatures, the image taken by the image sensor in the absence of light with the minimum integration time and at the same temperature, and determining the coefficients of the exponential component by exponential fitting calculations applied to the respective pixels of the corrected images obtained at different temperatures and corresponding to the same integration time.

According to an embodiment, the coefficients of the exponential component are determined by averaging coefficients obtained by exponential fitting calculations for different integration times.

According to an embodiment, the noise reduction model comprises an identical component for all pixels of the image sensor depending on the integration time.

According to an embodiment, the method comprises acquiring a stream of video images, wherein the noise correction factor corresponding to each pixel of an image of the video stream is subtracted from the corresponding pixel of each image of the video stream.

According to an embodiment, the method comprises the steps of: receiving a command to select a gain value of the image sensor, and selecting for each pixel of the image to be corrected a pixel-specific noise correction factor as a function of the selected gain value, the noise correction factor being used to correct the value of each pixel of the image to be corrected, the noise correction factor being determined from a set of pixel-specific coefficients generated as a function of the selected gain value.

According to an embodiment, the method comprises, for each pixel of a corrected image after a noise reduction, multiplying the value of the pixel by a gain correction factor specific to the pixel, taken from a gain normalization table, to obtain an image with a normalized gain.

According to an embodiment, the method comprises updating the gain normalization table each time the integration time is changed, or each time the temperature of the image sensor deviates from a previous value by more than a temperature deviation threshold value, the updating of the gain normalization table being carried out by interpolation calculations applied to a set of gain normalization tables determined for different temperatures.

According to an embodiment, the method comprises the steps of: acquiring by the image sensor a series of images in the presence of a uniform light source with different integration times or at different intensities of the light source, each series of images being taken at a different respective temperature, determining a gain, for each pixel of one of the images of each image series, by a linear regression calculation applied to corresponding pixels in the images of the image series, and determining, for each pixel of one of the images of each image series, a gain correction factor by dividing an average of the gains obtained for all the pixels of the image series by the gain determined for the pixel.

According to an embodiment, the method comprises the steps of: acquiring by the image sensor a series of images in the absence of light, at an average integration time, each image being obtained with the image sensor subjected to a respective temperature, calculating, for each pixel of one of the images of the acquired image series, an average of deviations at different image sensor temperatures, each deviation being calculated for one image sensor temperature, between the value of the pixel of the image of the image series corresponding to the image sensor temperature and the noise correction factor defined for the pixel at the average integration time and at the image sensor temperature, and comparing the average of deviations to a threshold value, and if the average of deviations is greater than the threshold value for a pixel, considering the pixel as defective.

According to an embodiment, the method comprises a step of: correcting each image acquired by the image sensor by replacing the value of a defective pixel with a value of a neighboring pixel or an average value of neighboring pixels, or correcting each image acquired by the image sensor by replacing the respective values of a defective pixel and pixels neighboring the defective pixel with the values of a pixel neighboring the defective pixel and the pixels neighboring the defective pixel or an average value of pixels neighboring the defective pixel and the pixels neighboring the defective pixel.

Embodiments may also relate to a device for correcting defects appearing in an image produced by an image sensor, configured to implement the previously defined method.

Embodiments may also relate to an imaging device comprising an image sensor, a circuit for acquiring a temperature of the image sensor and a circuit for acquiring an integration time applied to the image sensor, configured to implement the previously defined method.

According to an embodiment, the image sensor is of a CTIA or SF type.

Embodiments may also relate to a computer program product loadable into the memory of a computer, which, when executed by the computer, configures the computer to perform the previously defined method.

BRIEF DESCRIPTION OF THE DRAWINGS

Exemplary embodiments of the disclosure will become more clearly apparent from the following description provided for exemplary purposes only and represented in the appended drawings, in which.

DETAILED DESCRIPTION

FIG. 1 through FIG. 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
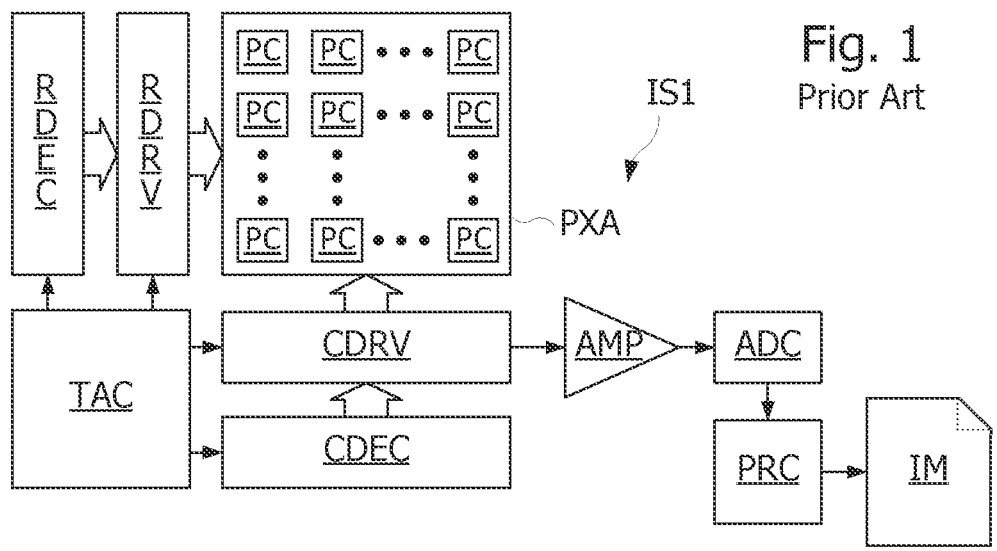
FIG. 1 schematically represents a conventional imaging device.

FIG. 1 shows an image sensor IS1 with processing circuitry ADC, AMP and PRC. The image sensor IS1 may be integrated into a portable device such as a camera, camcorder, cell phone, or any other device with an image capture function. The image sensor IS1 typically includes an array PXA of pixel circuits PC. The array PXA comprises pixel circuits PC arranged in a plurality of rows and a plurality of columns. The image sensor IS1 also includes control circuitry RDRV, RDEC, CDRV, CDEC, TAC, configured to provide different control signals to the pixel circuits PC according to different phases to be chained to capture images. Readout and processing circuitry may include an amplifier AMP, an analog-to-digital converter ADC and a processor PRC. The array PXA provides pixel signals to the readout and processing circuitry AMP, ADC, PRC, configured to provide images IM from the pixel signals.

Pixel rows are selectively activated by a row driver circuit RDRV in response to a row address decoder RDEC. The pixel columns are in turn activated by a column driver circuit controlled by a column decoder CDEC. The circuits RDRV and CDRV provide the appropriate voltages to drive the pixel circuits PC. The sensor IS also includes a control circuit TAC that drives the address decoders RDEC and CDEC and the drive circuits RDRV and CDRV to select the appropriate pixel row and column for pixel readout at any given time. The read pixel signals are amplified by the amplifier AMP, and converted to digital by the analog-to-digital converter ADC. The digital converted pixel signals are processed by the image processor PRC, which provides an image IM from the digital converted pixel signals. The image processor PRC may include memories to process and store the received image signals.

Figure 2:
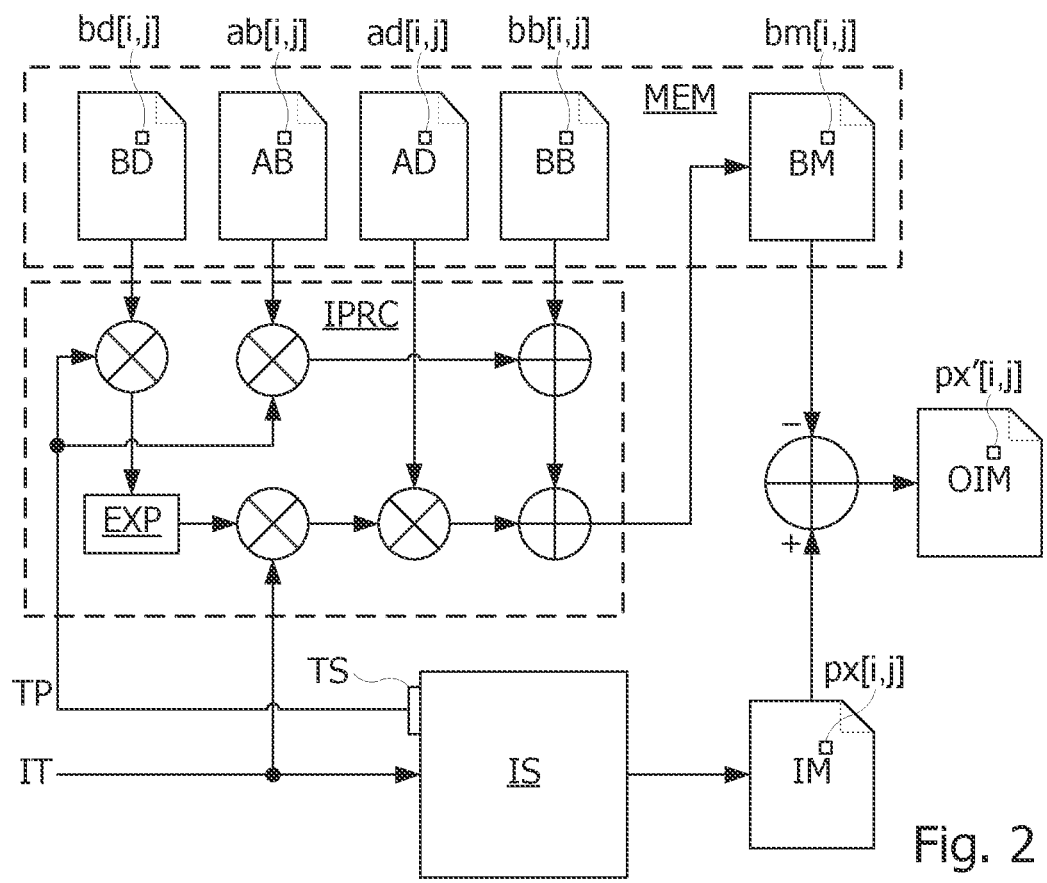
FIG. 2 schematically represents an image sensor associated with a noise reduction device for an imaging device, according to an embodiment.

FIG. 2 shows an image sensor IS associated with a noise reduction device, according to an embodiment. In the example of FIG. 2, the noise reduction device includes a noise reduction function implemented by a processor IPRC coupled to a memory MEM. The processor IPRC may be integrated with or connected to the image sensor IS. The definition of the noise reduction function is based on a noise model with two components, namely a bias component that varies linearly with the temperature of the image sensor, and a dark current component that varies with both temperature and integration time.

According to an embodiment, the noise model implemented by the processor IPRC is defined by the following equation:

$$bm[i,j] = IT \times ad[i,j] \times \mathrm{Exp}(bd[i,j] \times TP) + ab[i,j] \times TP + bb[i,j] \quad (1)$$

where $bm[i,j]$ is a pixel of a correction image BM to be subtracted from each image produced by the image sensor IS, the position of the pixel being identified by row and column indices i, j, IT is the integration time, TP is the temperature measured by the image sensor IS or a temperature sensor TS coupled to the image sensor, $ad[i,j]$, $bd[i,j]$, $ab[i,j]$ and $bb[i,j]$ are coefficients determined for the pixel to be corrected at position [i,j], and EXP is the exponential function. The coefficients $ad[i,j]$, $bd[i,j]$, $ab[i,j]$ and $bb[i,j]$ are input and stored as tables AD, BD, AB, BB in the memory MEM of the imaging device. Each pixel $px[i,j]$ of an image IM generated by the image sensor is corrected to produce a corrected image OIM by applying the following equation:

$$px'[i,j] = px(j,j) - bm[i,j] \quad (2)$$

where $px'[i,j]$ is the corrected value of the pixel $px[i,j]$.

Under these conditions, the pixel values provided by the image sensor IS can be individually corrected for all integration times and operating and imaging device temperatures. Because of the simplicity of the correction by subtracting from each pixel $px[i,j]$ of the image IM the corresponding pixel $bm[i,j]$ of the correction image BM, the images provided by the image sensor IS can be processed at very high frame rates. Thus, the processor IPRC can process video streams, including video streams at several hundred frames per second. If necessary, this correction may be performed by a hard-wired logic circuit (as shown in FIG. 2). In addition, all pixels of each frame can be processed simultaneously in parallel, by providing such a circuit for each pixel of the frame.

Similarly, due to the simplicity of equation (1) involving only addition, multiplication and exponentiation EXP operations, the calculation of the correction image BM can be performed in real time following a change in temperature TP or in integration time IT. If necessary, the update function of the correction image BM executed by the processor IPRC may also be performed by a hard-wired logic circuit (as shown in FIG. 2), while the exponentiation operation EXP can be performed simply by a lookup table. All pixels $bm[i,j]$ of the correction image BM can also be computed in parallel, knowing that there is no interaction between the pixels of the image BM.

Figure 3:
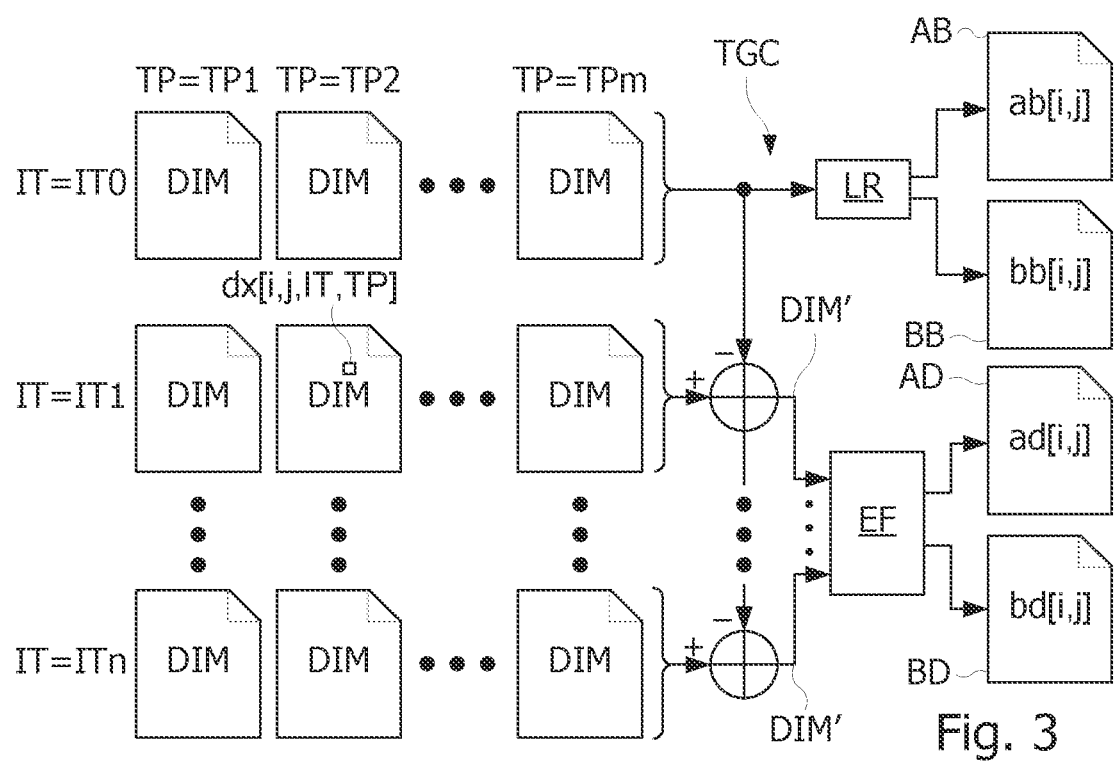
FIG. 3 schematically illustrates a method for calculating noise reduction coefficients, according to an embodiment.

FIG. 3 represents a generation circuit TGC of the coefficient tables AD, BD, AB, BB. The circuit TGC receives as input dark images DIM[IT0-ITn, TP1-TPm] obtained using the imaging device, during a calibration phase, by subjecting the image sensor IS to different temperatures TP1, TP2, . . . TPm, and for each temperature, successively setting the integration time IT to different values IT0, IT1, . . . ITn, including a minimum value IT0. The temperatures TP1-TPm can be selected within the operating temperature range of the image sensor IS. In addition, the number of integration time values can be set to a number between 5 and 15 within the range of possible integration time values of the imaging device.

In a first step, the bias coefficients $ab[i,j]$, $bb[i,j]$ are calculated from the images DIM[IT0, TP1-TPm] obtained with the minimum integration time IT0, where in equation (1) the integration time IT is a multiplicative factor in the dark signal component, and therefore this component becomes negligible when the integration time is very small. According to an example, the minimum integration time IT0 is between 10 and 100 µs, and preferably between 40 and 60 µs. As a first approximation, each pixel $dx[ij,IT0,TP]$ of the images DIM[IT0, TP1-TPm] obtained with the integration time IT0 may be modeled by the following equation:

$$dx[i,j,IT0,TP] \cong ab[i,j] \times TP + bb[i,j] \quad (3)$$

with TP=TP1, TP2, . . . TPm. Thus, the bias coefficients $ab[i,j]$ and $bb[i,j]$ from the tables AB, BB can be determined for each pixel $dx[ij,IT0,TP]$, in the temperature range TP1-TPm, by a linear regression calculation LR.

In a second step, the dark coefficients $ad[i,j]$, $bd[i,j]$ of the tables AD, BD are calculated. For this purpose, corrected images DIM'[IT1-ITn, TP1-TPm] are derived from the images DIM[IT1-ITn, TP1-TPm] by subtracting from each pixel $dx[i,j,IT,TP]$ of each image DIM[IT, TP] obtained for the integration times IT1-ITn and the temperatures TP1-TPm, the value of the corresponding pixel $dx[ij,IT0,TP]$ located in the image DIM[IT0, TP] obtained for the same temperature TP and for the minimum integration time IT0. Thus, considering equation (1), each pixel $dx'[i,j,IT,TP]$ of the corrected images DIM[IT1-ITn, TP1-TPm] may be modeled by the following equation:

$$dx'[i,j,IT,TP] = IT \times ad[i,j,IT] \times \mathrm{Exp}(bd[i,j,IT] \times TP) \quad (4)$$

with dx' [i,j,IT,TP]=dx[i,j,IT,TP]−dx[i,j,IT0,TP].

The dark coefficients $ad[i,j]$ and $bd[i,j]$ can be determined for each integration time IT1-ITn by an exponential fitting calculation EF. Such a calculation is implemented, for example, in the MathWorks® MATLAB software library. The dark coefficients $ad[i,j]$ and $bd[i,j]$ stored in the tables AD, BD can be obtained by averaging the coefficients $ad[i,j,IT]$ and $bd[i,j,IT]$ obtained with the integration times IT1-ITn, respectively.

Depending on the image sensors, it may be suitable to add an identical compensation component to the noise model for all pixels of the image sensor, depending on the integration time. This component can be determined by comparing the pixels at a position [i,j] in the images DIM obtained at the same temperature TP for the integration times IT0-ITn. This comparison can be performed by considering a few pixels in each of the images DIM obtained at the same temperature TP, for the different integration times IT0-ITn, the compensation component being set at an average value of the values obtained for the considered pixels.

Figure 4:
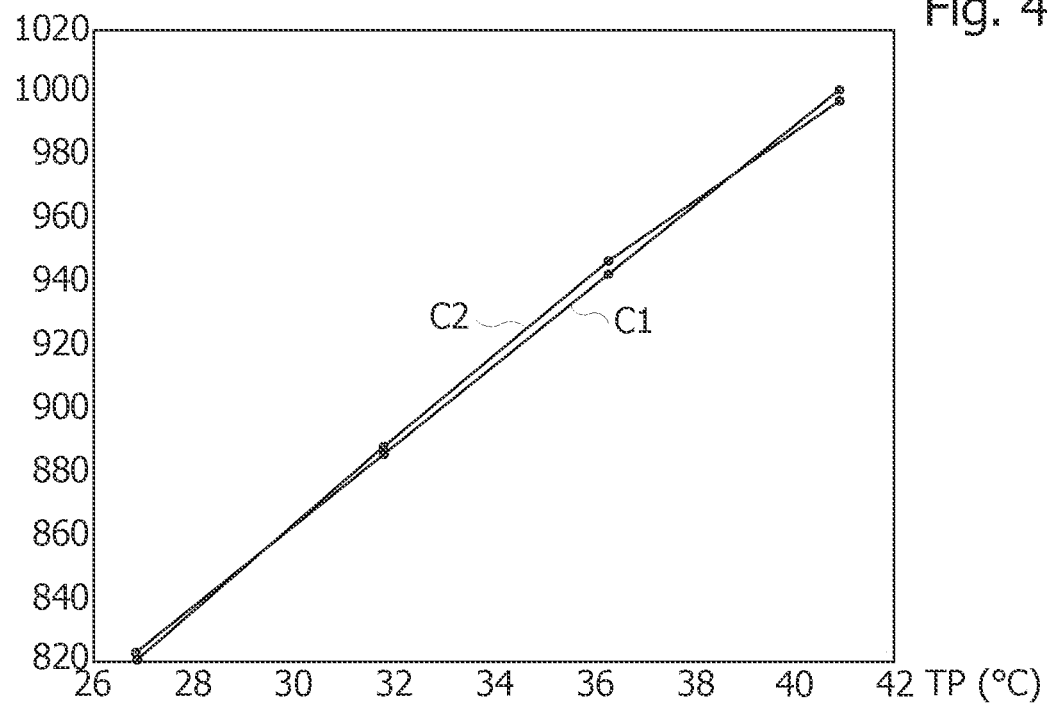
FIGS. 4 to 6 represent curves of variation in intensity of pixel signals as a function of the temperature of the image sensor.
Figure 5:
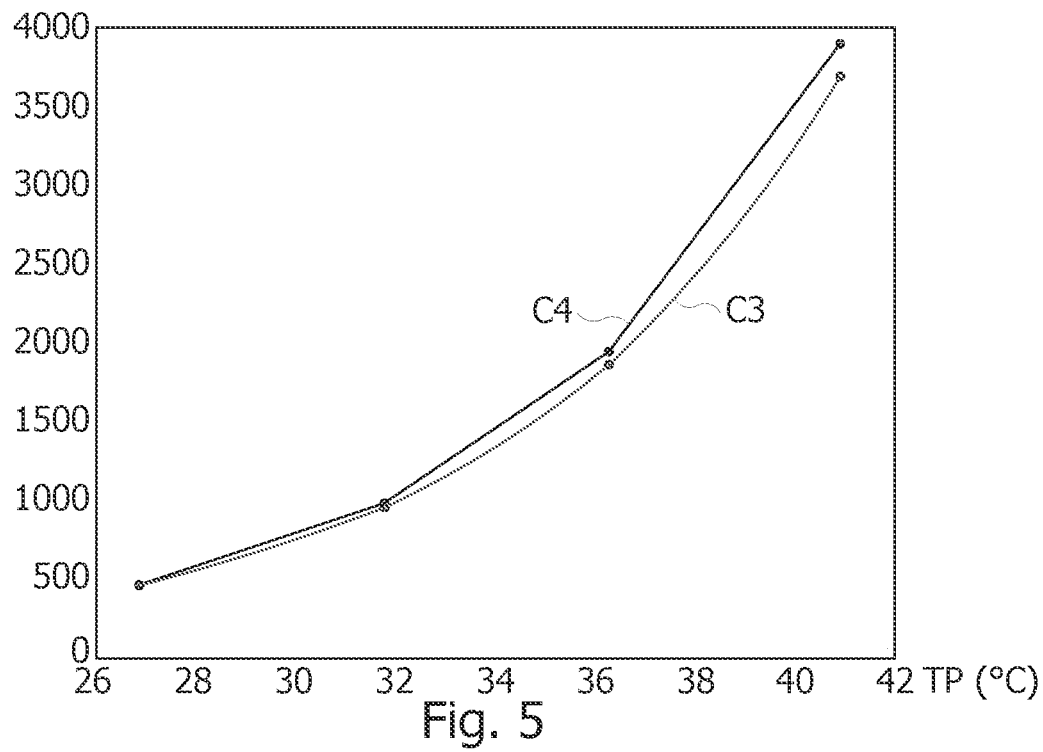
Figure 6:
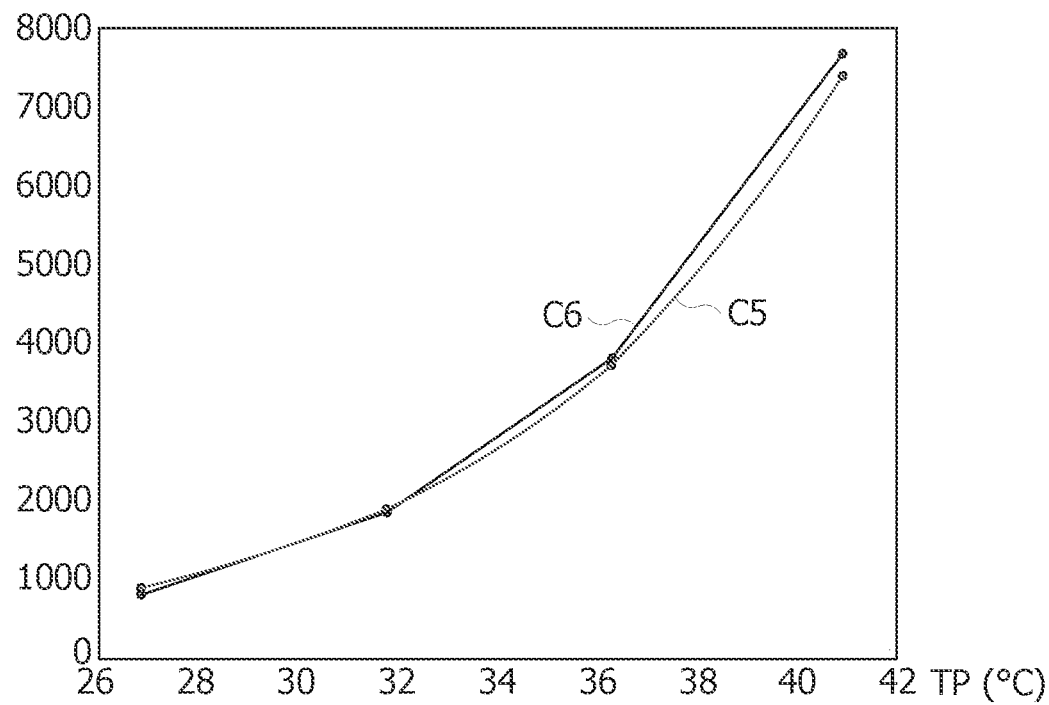

Each of FIGS. 4 to 6 represents a curve C2, C4, C6 of variation of the value of a pixel px[i,j] as a function of temperature TP in uncompensated images IM provided by the image sensor IS, and a curve C1, C3, C5 corresponding to the model bm[i,j] defined by equation (1), and determined for pixel [i,j] by the coefficients ad[i,j], bd[i,j], ab[i,j] and bb[i,j]. The curves C2, C4, C6 were plotted from pixel values px[i,j] obtained at temperatures TP1≅27° C., TP2≅32° C., TP3≅36.5° C. and TP4≅41° C.

Curves C1, C2 in FIG. 4 correspond to an integration time of 50 µs. FIG. 4 shows a difference of less than 0.6% between the value of the pixel px[i,j] at the output of the image sensor IS and the corresponding value bm[i,j] determined by the model (equation (1)).

The C3-C6 curves in FIGS. 5 and 6 were obtained with integration times of 6.654 ms and 13.321 ms, respectively. FIG. 5 shows a maximum deviation between the measured value of the pixel px[i,j] and the corresponding value bm[i,j] determined by the model of less than 14%. FIG. 6 shows a maximum deviation of less than 8% between the value of pixel px[i,j] output by the image sensor IS and the corresponding value bm[i,j] determined by the model. It can be observed that these maximum deviations are obtained at temperatures above 38° C.

According to an embodiment, the processor IPRC periodically or continuously receives the temperature TP from the image sensor IS, and each time the processor IPRC calculates the correction image BM, it stores the current temperature measured by the image sensor IS. When the current value of the temperature measurement provided by the image sensor deviates from the stored value, the processor IPRC recalculates the correction image BM taking into account the last temperature measurement provided by the image sensor. Depending on the implementation method, a new calculation of the BM correction image is performed when a temperature difference of between 0.5° C. and 2° C. occurs, e.g. 1° C. Similarly, when the IT integration time is changed, the IPRC processor recalculates the BM correction image according to the new integration time.

According to an embodiment, the image sensor IS has several gain values that can be selected from a control interface of the imaging device or according to the illumination conditions of the image sensor. In this case, dark images DIM are generated for each gain value to determine tables of coefficients AD, BD, AB, BB for each gain value. The integration time values IT used to generate the images DIM can be selected based on the gain values to avoid the unlikely cases where the risk of saturation of the image sensor IS is high. In addition, the processor IPRC calculates a current correction image BM for each gain value, based on the integration time IT and the temperature of the image sensor IS.

The quality of the images produced by an image sensor can also be degraded due to a variation in gain from one pixel to another, and as a function of the temperature of the image sensor. The variation in gain from one pixel to another can result in particular from structural differences between the pixel circuits.

Figure 7:
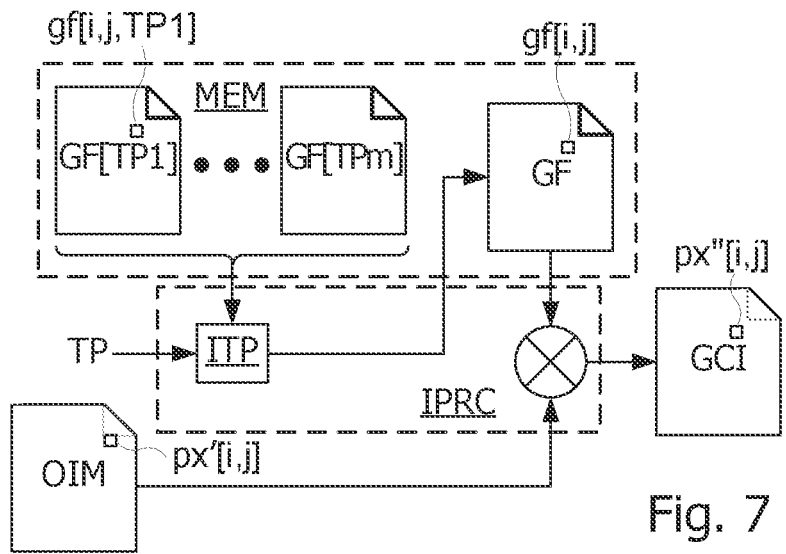
FIG. 7 schematically represents a block diagram of a gain correction circuit receiving the images from the noise reduction device, according to an embodiment.

FIG. 7 shows a gain correction circuit, according to an embodiment. The gain correction circuit receives the corrected image OIM at the output of the noise reduction circuit and multiplies each pixel px'[i,j] of the corrected image OIM by a gain correction factor gf[i,j] calculated for pixel [i,j] as a function of the current temperature of the image sensor. The pixels px"[i,j] of the resulting corrected image GCI were thus produced with a gain that is uniform throughout the image GCI.

The gain correction factor gf[i,j] belongs to a gain normalization table GF[i,j] stored in memory MEM and determined by an interpolation module ITP as a function of the temperature TP of the image sensor and a set of gain normalization tables GF[TP1], . . . GF[TPm] determined for various temperatures TP1, . . . TPm. The interpolation applied by the interpolation module ITP may be, for example, a linear interpolation or a polynomial interpolation.

According to an embodiment, the gain normalization table GF is updated when a temperature difference of between 0.5° C. and 2° C., for example 1° C., occurs with respect to the temperature previously taken into account for the calculation of the correction table.

The image processing illustrated in FIG. 7 may be implemented by the processor IPRC to process video streams, including video streams at several hundred frames per second. If necessary, this processing may be performed by a hard-wired logic circuit (as shown in FIG. 7). In addition, all pixels of each frame can be processed simultaneously in parallel, by providing such a circuit for each pixel of the frame.

Similarly, due to the simplicity of the processing involving only addition, multiplication and inversion operations, the calculation of the gain normalization table GF can be performed in real time following a temperature variation. If necessary, the function for updating the gain normalization table GF executed by the processor IPRC may also be performed by a hard-wired logic circuit (as shown in FIG. 7), knowing that, if necessary, the interpolation operation can be performed at least partly using one or more lookup tables. All pixels gf[i,j] of the gain normalization table GF may also be calculated in parallel.

Figure 8:
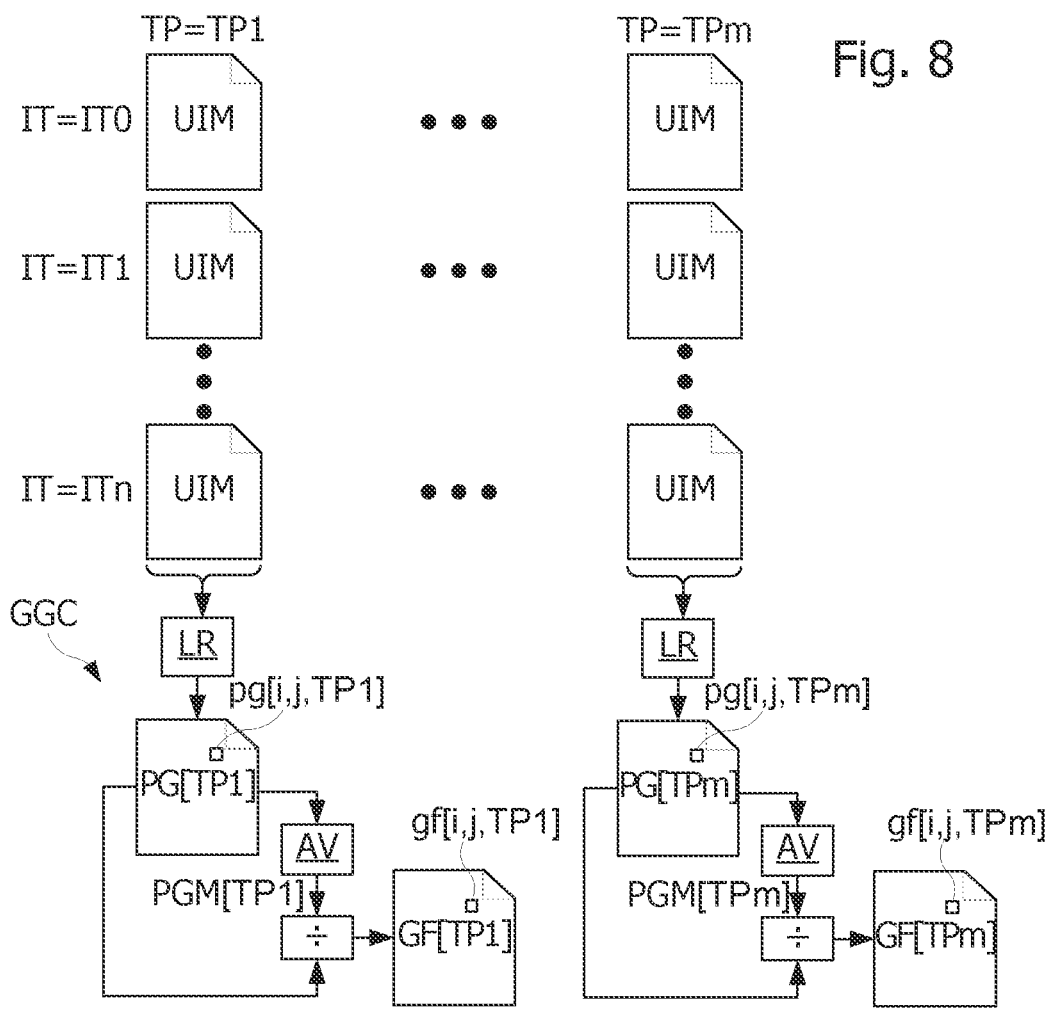
FIG. 8 schematically illustrates a block diagram of a circuit for generating tables of gain correction coefficients, according to an embodiment.

FIG. 8 represents a circuit GGC for generating the gain normalization tables GF[TP1], . . . GF[TPm], according to an embodiment. The computing circuit receives as input images UIM[IT0 . . . ITn, TP1 . . . TPm] obtained during a calibration phase, using the imaging device placed in front of a light source having an apparent uniform light intensity in all directions. The images UIM[IT0 . . . ITn, TP1 . . . TPm] were obtained by subjecting the image sensor IS to different temperatures TP1, TPm, and for each temperature, by successively setting the integration time IT to different values IT0, . . . ITn. The light source used to generate the images UIM[IT0 . . . ITn, TP1 . . . TPm] may be an integrating sphere, the imaging device being placed inside the opening of the integrating sphere. Instead of varying the integration time IT, it is also possible to vary the light intensity emitted by the uniform light source, by setting the integration time of the image sensor, for example to an average value. The temperatures TP1, TPm used are, for example, set at 20, 30, 40 and 50° C.

The circuit GGC calculates a gain table PG[TP] for each of the temperatures TP1-TPm, using an linear regression calculation circuit RL, the gain pg[i,j,TP] of each pixel [i,j] corresponding to the average slope of the curve of the value of pixel px[i,j] as a function of the integration time IT. By computing an average AV, the circuit GGC then determines for each temperature TP=TP1, . . . TPm, a table of average gains PGM[TP], including an average gain value for each pixel [i,j]. Each gain normalization table GF[TP1], . . . GF[TPm] is then generated by dividing, for each pixel [i,j], the corresponding value pgm[i,j] in the average gain table PGM[TP] by the corresponding value pg[i,j,TP] in the gain table PG[TP].

The quality of the images provided by the image sensor IS may also be affected by the presence of defective pixel circuits. According to an embodiment, the processor IPRC is configured to calculate, for each pixel [i,j], an average of deviations E[i,j] at different temperatures TP=TP1, . . . TPm, between the pixel value dx[i,j,IT,TP] of the images DIM provided by the image sensor IS at an average integration time $IT_{moy}$, and the correction value bm[i,j,IT,TP] for this pixel, and to compare this average to a threshold value. If this average deviation is greater than the threshold value for a pixel [i,j], pixel [i,j] is considered defective. The detection of defective pixels can be performed during the calibration phase following the acquisition of the images DIM. For example, the average deviation E[i,j] can be calculated for each pixel [i,j] by the following equation:

$$E[i,j]=[E_{TP}(dx[i,j,IT_{moy},TP]-bm[i,j,IT_{moy},TP])^2]^{1/2} \quad (5)$$

with TP=TP1, TP2 . . . TPm.

According to an embodiment, the processor IPRC performs a correction of the image OIM or GCI by replacing the value px'[i,j] or p"[i,j] of each pixel thus detected defective by the value of a neighboring pixel, or an average value of pixels neighboring the defective pixel. Pixels neighboring a defective pixel may also be considered defective and form a defective pixel area. In this case, each pixel of the defective pixel area can be replaced by a neighboring pixel of the defective pixel area or an average value of these neighboring pixels.

It will become clear to those skilled in the art that the present disclosure is susceptible to variations and various applications. In particular, the disclosure is not limited to an image sensor performing the calculation of the correction image BM. Indeed, the correction image BM can be determined by an external computer having the tables AB, BB, AD, BD and receiving from the image sensor the integration time IT and the temperature TP of the image sensor IS, and if necessary, the gain applied by the image sensor.

Moreover, the correction of the images provided by the image sensor may also be performed by such an external computer receiving the uncompensated images IM from the image sensor.

In addition, the temperature TP is not necessarily provided by the image sensor IS, but can be measured by an external temperature sensor associated with the image sensor.

The processed images can be still images or video images.

Pixel gain correction may be performed from corrected images OIM obtained by other noise reduction processes, so that the gain correction can be implemented without performing the noise reduction correction described with reference to FIG. 2.

Similarly, the detection of defective pixels as described above can be performed without using any of the correction methods illustrated in FIGS. 2 and 7, performed to obtain the images OIM and GCI. Similarly, the correction of defective pixels can be performed on an uncorrected image, i.e., without using either of the correction methods shown in FIGS. 2 and 7.

What is claimed is:

1. A method of correcting defects appearing in an image produced by an image sensor, the method comprising:
receiving an image to be corrected, taken by the image sensor;
receiving a temperature from the image sensor, acquired when the image to be corrected is taken by the image sensor;
receiving an integration time applied by the image sensor when taking the image to be corrected; and
for each pixel of the image to be corrected, subtracting from a pixel value a pixel-specific noise correction factor derived from a noise reduction model comprising a linear component dependent on a temperature of the image sensor, added to an exponential component depending on the temperature of the image sensor and multiplied by the integration time, the linear and exponential components depending on coefficients specific to the pixel,
wherein coefficients of the exponential component are determined by:
acquiring by the image sensor images in the absence of light, at different integration times, the image sensor being subjected to different temperatures, the integration times including a minimum integration time; and
generating corrected images obtained by subtracting from each of the images taken by the image sensor in the absence of light at the different integration times and at the different temperatures, the image taken by the image sensor in the absence of light with the minimum integration time and at a same temperature, the coefficients of the exponential component being determined by exponential fitting calculations applied to the respective pixels of the corrected images obtained at the different temperatures and corresponding to the same integration time.

2. The method according to claim 1, wherein the noise reduction model is defined by the following equation:

$$bm[i,j]=IT \times ad[i,j] \times \text{Exp}(bd[i,j] \times TP) + ab[i,j] \times TP + bb[i,j],$$

where bm[i,j] is the noise correction factor to be subtracted from a corresponding pixel of the image to be corrected, IT is the integration time, TP is the temperature of the image sensor, Exp is the exponential function, and ad[i,j], bd[i,j], ab[i,j] and bb[i,j] are the pixel-specific coefficients.

3. The method according to claim 1, comprising calculating the noise correction factor of each pixel each time the integration time is changed, or each time the temperature of the image sensor deviates from a previous value by more than a temperature deviation threshold value.

4. The method according to claim 1, comprising:
acquiring by the image sensor images in the absence of light with a minimum integration time, each image being taken at a distinct respective temperature; and
determining, for each pixel of the image to be corrected, coefficients of the linear component, by linear regression calculations applied to corresponding pixels in the images in the absence of light taken at the respective temperatures.

5. The method according to claim 1, wherein the coefficients of the exponential component are determined by averaging coefficients obtained by exponential fitting calculations for different integration times.

6. The method according to claim 1, wherein the noise reduction model comprises an identical component for all pixels of the image sensor depending on the integration time.

7. The method according to claim 1, comprising acquiring a stream of video images, wherein the noise correction factor corresponding to each pixel of an image of the video stream is subtracted from the corresponding pixel of each image of the video stream.

8. The method according to claim 1, comprising:
receiving a command to select a gain value of the image sensor; and
selecting for each pixel of the image to be corrected a pixel-specific noise correction factor as a function of the selected gain value, the noise correction factor being used to correct the value of each pixel of the image to be corrected, the noise correction factor being determined from a set of pixel-specific coefficients generated as a function of the selected gain value.

9. The method according to claim 1, comprising, for each pixel of a corrected image after a noise reduction, multiplying the value of the pixel by a gain correction factor specific to the pixel, taken from a gain normalization table, to obtain an image with a normalized gain.

10. The method according to claim 9, comprising updating the gain normalization table each time the integration time is changed, or each time the temperature of the image sensor deviates from a previous value by more than a temperature deviation threshold value, the updating of the gain normalization table being carried out by interpolation calculations applied to a set of gain normalization tables determined for different temperatures.

11. The method according to claim 10, comprising:
acquiring by the image sensor a series of images in the presence of a uniform light source with different integration times or at different intensities of the light source, each series of images being taken at a different respective temperature;
determining a gain, for each pixel of one of the images of each image series, by a linear regression calculation applied to corresponding pixels in the images of the image series; and
determining, for each pixel of one of the images of each image series, a gain correction factor by dividing an average of the gains obtained for all the pixels of the image series by the gain determined for the pixel.

12. The method according to claim 1, comprising:
acquiring by the image sensor a series of images in the absence of light, at an average integration time, each image being obtained with the image sensor subjected to a respective temperature;
calculating, for each pixel of one of the images of the acquired image series, an average of deviations at different image sensor temperatures, each deviation being calculated for one image sensor temperature, between the value of the pixel of the image of the image series corresponding to the image sensor temperature and the noise correction factor defined for the pixel at the average integration time and at the image sensor temperature; and
comparing the average of deviations to a threshold value, and if the average of deviations is greater than the threshold value for a pixel, considering the pixel as defective.

13. The method according to claim 12, comprising:
correcting each image acquired by the image sensor by replacing the value of a defective pixel with a value of a neighboring pixel or an average value of neighboring pixels; or
correcting each image acquired by the image sensor by replacing the respective values of a defective pixel and pixels neighboring the defective pixel with the value of a pixel neighboring the defective pixel and the pixels neighboring the defective pixel or an average value of pixels neighboring the defective pixel and the pixels neighboring the defective pixel.

14. A device for correcting defects appearing in an image produced by an image sensor, the device comprising:
a processor; and
memory coupled to the processor, the memory comprising instructions that, when executed by the processor, cause the device to:
receive an image to be corrected, taken by the image sensor;
receive a temperature from the image sensor, acquired when the image to be corrected is taken by the image sensor;
receive an integration time applied by the image sensor when taking the image to be corrected;
for each pixel of the image to be corrected, subtract from a pixel value a pixel-specific noise correction factor derived from a noise reduction model comprising a linear component dependent on a temperature of the image sensor, added to an exponential component depending on the temperature of the image sensor and multiplied by the integration time, the linear and exponential components depending on coefficients specific to the pixel;
determine coefficients of the exponential component are determined by:
acquire by the image sensor images in the absence of light, at different integration times, the image sensor being subjected to different temperatures, the integration times including a minimum integration time; and
generate corrected images obtained by subtracting from each of the images taken by the image sensor in the absence of light at the different integration times and at the different temperatures, the image taken by the image sensor in the absence of light with the minimum integration time and at a same temperature, the coefficients of the exponential component being determined by exponential fitting calculations applied to the respective pixels of the corrected images obtained at the different temperatures and corresponding to the same integration time.

15. An imaging device comprising:
an image sensor;
a circuit for acquiring a temperature of the image sensor;
a circuit for acquiring an integration time applied to the image sensor;
a processor; and
memory coupled to the processor, the memory comprising instructions that, when executed by the processor, cause the device to:
receive an image to be corrected, taken by the image sensor;
receive a temperature from the image sensor, acquired when the image to be corrected is taken by the image sensor;
receive an integration time applied by the image sensor when taking the image to be corrected;
for each pixel of the image to be corrected, subtract from a pixel value a pixel-specific noise correction factor derived from a noise reduction model comprising a linear component dependent on a temperature of the image sensor, added to an exponential component depending on the temperature of the image sensor and multiplied by the integration time, the linear and exponential components depending on coefficients specific to the pixel;

determine coefficients of the exponential component;

acquire by the image sensor images in the absence of light, at different integration times, the image sensor being subjected to different temperatures, the integration times including a minimum integration time; and generate corrected images obtained by subtracting from each of the images taken by the image sensor in the absence of light at the different integration times and at the different temperatures, the image taken by the image sensor in the absence of light with the minimum integration time and at a same temperature, the coefficients of the exponential component being determined by exponential fitting calculations applied to the respective pixels of the corrected images obtained at the different temperatures and corresponding to the same integration time.

16. A device according to claim 14, wherein the image sensor is of a Charge Trans Impedance Amplifier (CTIA) or Source Follower (SF) type.

17. A device according to claim 15, wherein the image sensor is of a Charge Trans Impedance Amplifier (CTIA) or Source Follower (SF) type.

18. A non-transitory computer-readable medium carrying one or more sequences of instructions, which, when executed by one or more processors, causes the one or more processors to:

receive an image to be corrected, taken by an image sensor;

receive a temperature from the image sensor, acquired when the image to be corrected is taken by the image sensor;

receive an integration time applied by the image sensor when taking the image to be corrected;

for each pixel of the image to be corrected, subtract from a pixel value a pixel-specific noise correction factor derived from a noise reduction model comprising a linear component dependent on a temperature of the image sensor, added to an exponential component depending on the temperature of the image sensor and multiplied by the integration time, the linear and exponential components depending on coefficients specific to the pixel;

determine coefficients of the exponential component;

acquire by the image sensor images in the absence of light, at different integration times, the image sensor being subjected to different temperatures, the integration times including a minimum integration time; and generate corrected images obtained by subtracting from each of the images taken by the image sensor in the absence of light at the different integration times and at the different temperatures, the image taken by the image sensor in the absence of light with the minimum integration time and at a same temperature, the coefficients of the exponential component being determined by exponential fitting calculations applied to the respective pixels of the corrected images obtained at the different temperatures and corresponding to the same integration time.

* * * * *